United States Patent
Kadry et al.

(10) Patent No.: US 9,444,389 B2
(45) Date of Patent: Sep. 13, 2016

(54) DERATING CONTROL OF A POWER INVERTER MODULE

(71) Applicant: GM GLOBAL TECHNOLOGY OPERATIONS LLC, Detroit, MI (US)

(72) Inventors: Syed MD Jaffrey Al Kadry, Grand Blanc, MI (US); Mohammad N. Anwar, Van Buren Township, MI (US); MD Nayeem Arafat, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 14/608,794

(22) Filed: Jan. 29, 2015

(65) Prior Publication Data
US 2016/0226421 A1  Aug. 4, 2016

(51) Int. Cl.
*H02P 6/00* (2016.01)
*H02P 27/06* (2006.01)

(52) U.S. Cl.
CPC ..................................... *H02P 27/06* (2013.01)

(58) Field of Classification Search
USPC ......... 318/400.08, 400.21, 400.22, 792, 634, 318/641, 782, 7; 62/156, 168, 215, 505
See application file for complete search history.

(56) References Cited

U.S. PATENT DOCUMENTS

| | | | | |
|---|---|---|---|---|
| 4,478,274 A | * | 10/1984 | Naganoma | B60H 1/00971 165/202 |
| 5,923,135 A | * | 7/1999 | Takeda | B60L 11/1803 318/432 |
| 7,839,108 B2 | * | 11/2010 | Patel | H02H 7/0852 318/400.01 |
| 2004/0194497 A1 | * | 10/2004 | Sasaki | F01P 3/20 62/505 |
| 2010/0193267 A1 | * | 8/2010 | Nozawa | H02M 7/53873 180/65.1 |
| 2012/0001575 A1 | * | 1/2012 | Kubo | B60H 1/3213 318/400.17 |
| 2016/0084717 A1 | * | 3/2016 | Jeong | B60R 16/02 374/170 |

FOREIGN PATENT DOCUMENTS

JP          2009012702 A  *  1/2009

* cited by examiner

*Primary Examiner* — Jorge L Carrasquillo
(74) *Attorney, Agent, or Firm* — Quinn Law Group, PLLC

(57) ABSTRACT

A system includes a DC battery pack, an inverter coolant loop, first and second temperature sensors, a polyphase electric machine, and a power inverter module (PIM) connected to the battery pack and electric machine. The PIM includes a plurality of semiconductor switches. The controller is operable to selectively derate the PIM and thus reduce a commanded torque to the electric machine. The controller is programmed to execute a method and thereby receive a coolant temperature from the first temperature sensor and a PIM temperature from the second temperature sensor, and to determine a set of electrical values of the electric machine. The controller estimates a junction temperature of the semiconductor switches using the temperature of the coolant, the temperature of the PIM, and the set of electrical values. The controller selectively derates the PIM using the estimated junction temperature when the temperature of the PIM exceeds a calibrated maximum temperature.

18 Claims, 5 Drawing Sheets

DERATING CONTROL OF A POWER INVERTER MODULE

TECHNICAL FIELD

The present disclosure relates to derating control of a power inverter module.

BACKGROUND

A powertrain of a hybrid electric vehicle or a battery electric vehicle typically includes one or more high-voltage electric machines, i.e., motor generator units or electric traction motors. Each electric machine draws electrical power from a rechargeable direct current (DC) battery pack. The energized electric machines deliver motor torque, up to a total available torque as determined by a controller, to various gear sets of a transmission. A boost converter may be used in some designs to increase the battery output voltage to a level suitable for use by the electric machines.

Power inverter modules or PIMs include semiconductor switches such as IGBTs or MOSFETs that are typically controlled via pulse-width modulation (PWM) techniques. Operation of the PIM ultimately converts the boosted DC battery output voltage into an alternating current (AC) output voltage. The AC output voltage is then applied to individual phase windings of the electric machines. The energized electric machines produce the motor torque which powers the vehicle or recharges the battery pack depending on the operating mode. The semiconductor switches within the PIM can become hot during extended PWM switching operations. Therefore, a process known as derating is used to reduce power output from the PIM and thereby help protect the semiconductor switches from overheating.

SUMMARY

A system is disclosed herein that includes a direct current (DC) battery pack, first and second temperature sensors, at least one polyphase electric machine, a power inverter module (PIM) that is electrically connected to the battery pack and electric machine, and an inverter coolant loop. The PIM includes a plurality of semiconductor switches, i.e., two or more switches. A controller of the system is in communication with the PIM and is programmed to selectively derate the PIM and thereby reduce a commanded torque to the electric machine(s). The controller is programmed to receive a temperature of the coolant in the inverter coolant loop from the first temperature sensor and a temperature of the PIM from the second temperature sensor, and to determine a set of electrical values of the electric machine(s). The controller is also programmed to estimate a junction temperature of the semiconductor switches using the temperature of the coolant, the temperature of the PIM, and the set of electrical values. The controller selectively derates the PIM using the estimated junction temperature when the temperature of the PIM exceeds a calibrated maximum temperature.

The controller may be programmed to derate the PIM by reducing an electrical phase current delivered to the electric machine(s). The controller at other times may derate the PIM by changing the method derating, e.g., changing between DPWM and SVPWM switching methods, and/or by reducing the frequency of switching.

The set of electrical values may include individual electrical phase currents of the electrical machine(s). In such an embodiment, the controller may record a corresponding value of a calibrated number of electrical phase currents in memory of the controller to generate a cumulative phase current, i.e., a phase current history, and to selectively derate the PIM when the cumulative phase current and the instantaneous phase current both exceed corresponding thresholds.

The set of electrical values may include power loss and thermal impedance of the semiconductor switches in an optional embodiment.

The controller may be programmed to calculate a numeric usage factor indicative of an age of the semiconductor switches, and to reduce the calibrated maximum temperature of the semiconductor switches using the calculated numeric usage factor. When the system is a vehicle, an odometer reading of the vehicle may be used to calculate the numeric usage factor.

The controller may be programmed with a calibrated coolant temperature setpoint and a voltage vs. coolant temperature curve or tabular relationship. In such an embodiment, the controller can limit an applied voltage to the semiconductor switches when the measured coolant temperature of coolant in the inverter coolant loop exceeds the calibrated coolant temperature setpoint and a present voltage applied to the electric machine(s) is high relative to the curve.

The controller may be programmed to monitor a trend in a change in coolant temperature, i.e., a rate and direction of change over time, with respect to the phase currents, and to detect a potential loss of the coolant using the trend.

A method is also disclosed herein for derating a PIM in a system having the PIM, a DC battery module, an inverter coolant loop, and one or more polyphase electric machines. In a particular embodiment, the method includes receiving, via a controller, a temperature of a coolant of the inverter coolant loop from a first temperature sensor and a temperature of the PIM from a second temperature sensor, and then determining a set of electrical values of the electric machine(s). The method also includes estimating a junction temperature of a plurality of semiconductor switches of the PIM using the temperature of the coolant, the temperature of the PIM, and the set of electrical values. Additionally, the method includes selectively derating the PIM, via the controller, using the estimated junction temperature when the temperature of the PIM exceeds a calibrated maximum temperature to thereby reduce a commanded torque to the electric machine(s).

The above and other features and advantages of the present disclosure are readily apparent from the following detailed description of the best modes when taken in connection with the accompanying drawings.

DETAILED DESCRIPTION

Figure 1:
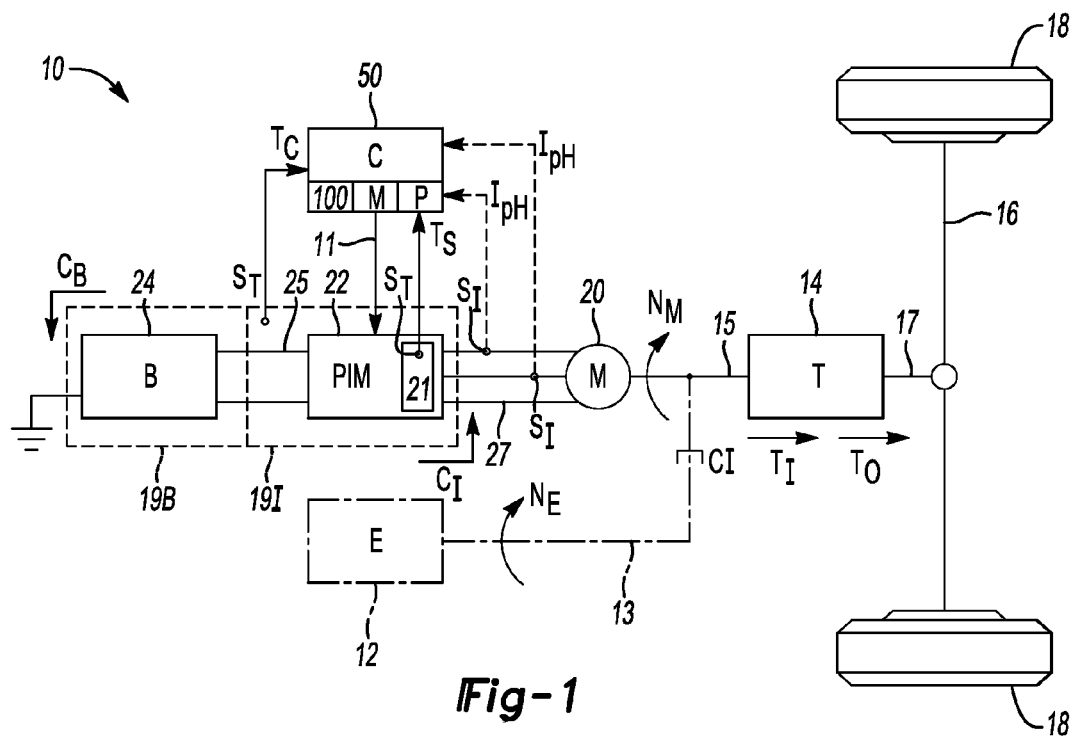
FIG. 1 is a schematic illustration of a vehicle having a power inverter module (PIM) and a controller programmed with derating control logic set forth herein.

Referring to the drawings, wherein like reference numbers refer to like components throughout the several views, a schematic example vehicle 10 is shown in FIG. 1 having a transmission (T) 14 with an input member 15 and an output member 17. The vehicle 10 may optionally include an internal combustion engine (E) 12 when configured as a hybrid electric vehicle, with the engine 12 connected to the transmission 14 via a crankshaft 13. Alternatively, the vehicle 10 may be a battery electric vehicle that foregoes use of the engine 12.

The transmission 14 includes or is connected to at least one polyphase electric machine (M) 20 in the form of an electric traction motor or a motor generator unit. While only one electric machine 20 is shown schematically in FIG. 1 for illustrative simplicity, two or more electric machines 20 may be used. Any control steps described herein may be extended to the control of multiple electric machines 20 in other embodiments, as will be understood by those of ordinary skill in the art.

The electric machine 20 rotates with a motor speed (arrow $N_M$). The optional engine 12 likewise rotates at engine speed (arrow $N_E$), and may be selectively connected to and disconnected from the input member 15 via operation of an input clutch CI, e.g., a plate clutch or a clutch and damper assembly. The transmission 14 thus receives input torque (arrow $T_I$) from the engine 12 and/or electric machine 20 and transmits output torque (arrow $T_O$) to the output member 17. The output member 17 ultimately delivers the output torque (arrow $T_O$) to a drive axle 16 and a set of drive wheels 18.

Each electric machine 20 is powered via a direct current (DC) battery pack (B) 24 and associated power electronics (not shown) via a power inverter module (PIM) 22. A battery coolant loop 19B as shown schematically in FIG. 1 may be used to circulate a coolant (arrow $C_B$) to the battery pack 24. Likewise, an inverter coolant loop 19I may be used to circulate coolant (arrow $C_I$) to the PIM 22 and any associated the power electronics. A power electronics coolant loop (PECL) pump (not shown) drives the coolant in the inverter coolant loop 19I, with the controller 50 controlling both coolant loops 19B and 19I in the example embodiment of FIG. 1.

The battery back 24 is electrically connected to the PIM 22 via a DC bus 25. The PIM 22 in turn is electrically connected to the electric machine 20 via an alternating current (AC) bus 27. The PIM 22 is operable to convert a DC voltage from the battery pack 24 to an AC output suitable for powering the electric machine 20 or multiple such machines via operation of a set of semiconductor switches 21. Semiconductor switching techniques such as pulse-width modulation (PWM) and associated IGBT, MOSFET, or thyristor semiconductor switches are well known in the art, and therefore a detailed description of PWM switching techniques and the underlying semiconductor structure is omitted for illustrative simplicity.

The vehicle 10 of FIG. 1 also includes a controller (C) 50 programmed and suitably configured in associated hardware to control operation of the PIM 22. In particular, the controller 50 automatically reduces or derates the power output from the PIM 22 in a manner that depends on electrical conditions aboard the vehicle 10 as set forth below. Derating temporarily limits a torque command to and/or available output torque from the electric machine 20, for instance by reducing a voltage, current, PWM or other switching method, and/or a switching frequency of the PIM 22 to thereby reduce an actual junction temperature of semiconductor switches 21 of the PIM 22. This end may be achieved according to methods 100 or 200 as set forth below with reference to FIGS. 2-7.

The controller 50 of FIG. 1 transmits control signals (arrow 11) to the PIM 22 and, in method 100, receives a measured temperature ($T_S$) from a temperature sensor $S_T$ positioned within the PIM 22, e.g., a thermistor or other suitable temperature sensor. The controller 50 also receives a coolant temperature ($T_C$) from another such sensor $S_T$ positioned in the inverter coolant loop 19I and operable to measure the temperature of coolant flowing in the inverter coolant loop 19I, and may also receive measured phase current values ($I_{PH}$) from phase current sensors Si. Alternatively, to reduce the number of sensors the phase current ($I_{PH}$) of each electrical phase can be calculated, i.e.,:

$$I_{PH} = \sqrt{I_d^2 + I_q^2}$$

where $I_d$ and $I_q$ are the controller-provided d-axis and q-axis current commands to the electric machine 20, as is well known in the art.

The controller 50, which is in communication with the electric machine 20 and the PIM 22, includes a processor P and memory M. The memory M includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

Conventional derating techniques compare a received measured PIM temperature from the temperature $T_S$, which serves as an approximation of the temperature of the semiconductor switches used within such a PIM, i.e., a junction temperature ($\theta_j$). The received temperature $T_S$ is compared to a calibrated threshold maximum temperature, e.g., 150° C., and a derating determination is made based on the results of this comparison. The present control methodology departs from this convention, as it is recognized herein that it can be difficult to accurately determine the junction temperature of a switch in real-time. In the vehicle 10 shown in FIG. 1, for instance, thermistors or other sensors used to measure junction temperatures cannot be precisely placed at the true switching junction of the switches 21. Moreover, such sensors have a relatively slow dynamic response. Therefore, the present approach begins with the recognition that a measured junction temperature, e.g., $T_S$, is delayed and therefore is not a true or accurate indicator of the junction temperature at any given moment.

To account for the use of any remotely-located thermistors and their relatively slow dynamic response, the calibrated maximum temperature may be lowered to impose a fixed margin of error. A result of such an approach may be that the operation of the PIM 22, and thus the torque output of the electric machine 20, is limited long before the switching junction of the semiconductor switches 21 become too hot. The present method 100 and alternative method 200 described below are intended to help solve this particular control problem. In the case of method 200, the sensor $S_T$ may be omitted as the junction temperature is estimated purely via calculation, or the sensor $S_T$ may be retained for use in detecting a possible coolant fault, as explained below with reference to FIG. 3B.

Figure 2:
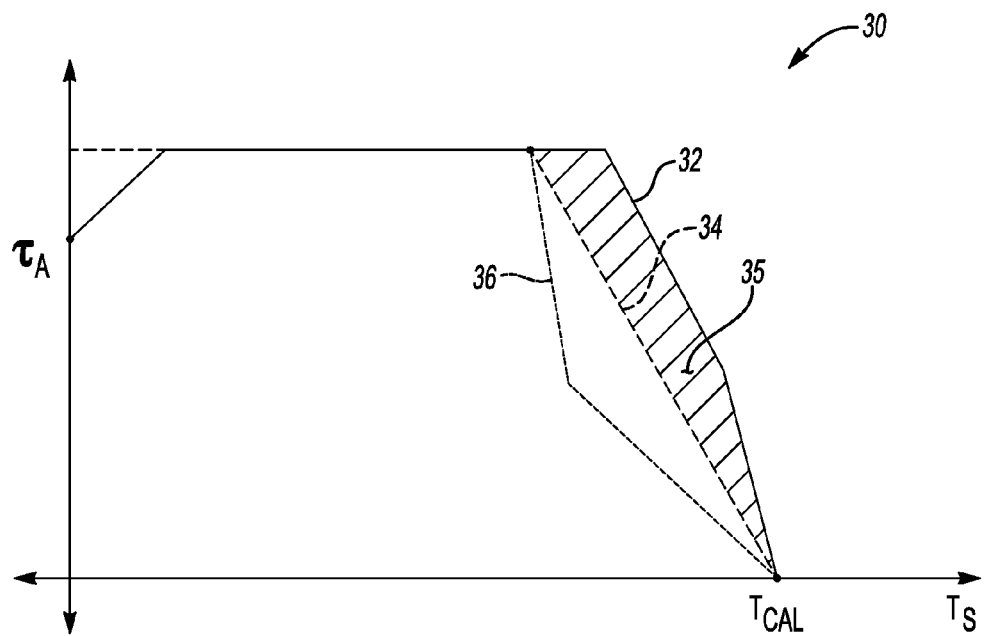
FIG. 2 is a plot generally describing operation of the present derating strategy, with available motor torque depicted on the vertical axis and a measured PIM temperature depicted on the horizontal axis.

Referring to the traces 30 of FIG. 2, which depict available motor torque ($\tau_A$) from the electric machine 20 on the vertical axis and the measured temperature ($T_S$) on the horizontal axis, the effect of the different derating approaches described generally above are shown as traces 34 and 36 of FIG. 2. Traces 34 and 36 respectively depict conventional and "overprotected" derating approaches. Trace 34 depicts derating of the output of the PIM 22 of FIG. 1 in a linear manner before a calibrated maximum temperature ($T_{CAL}$) is reached. Trace 36 illustrates an additional margin of error, with trace 36 rapidly dropping at a first rate and then approaching zero at a slower second rate. By way of contrast, the effect of the present methods 100 and 200 are depicted as trace 32. As explained below, estimation or calculation of the junction temperature of the semiconductor switches 21 may be based, for instance, on phase current and coolant temperature ($T_C$). Zone 35 illustrates the available motor torque ($\tau_A$) freed up by the methods 100 and 200, thereby allowing a wider possible operating region.

Figure 3A:
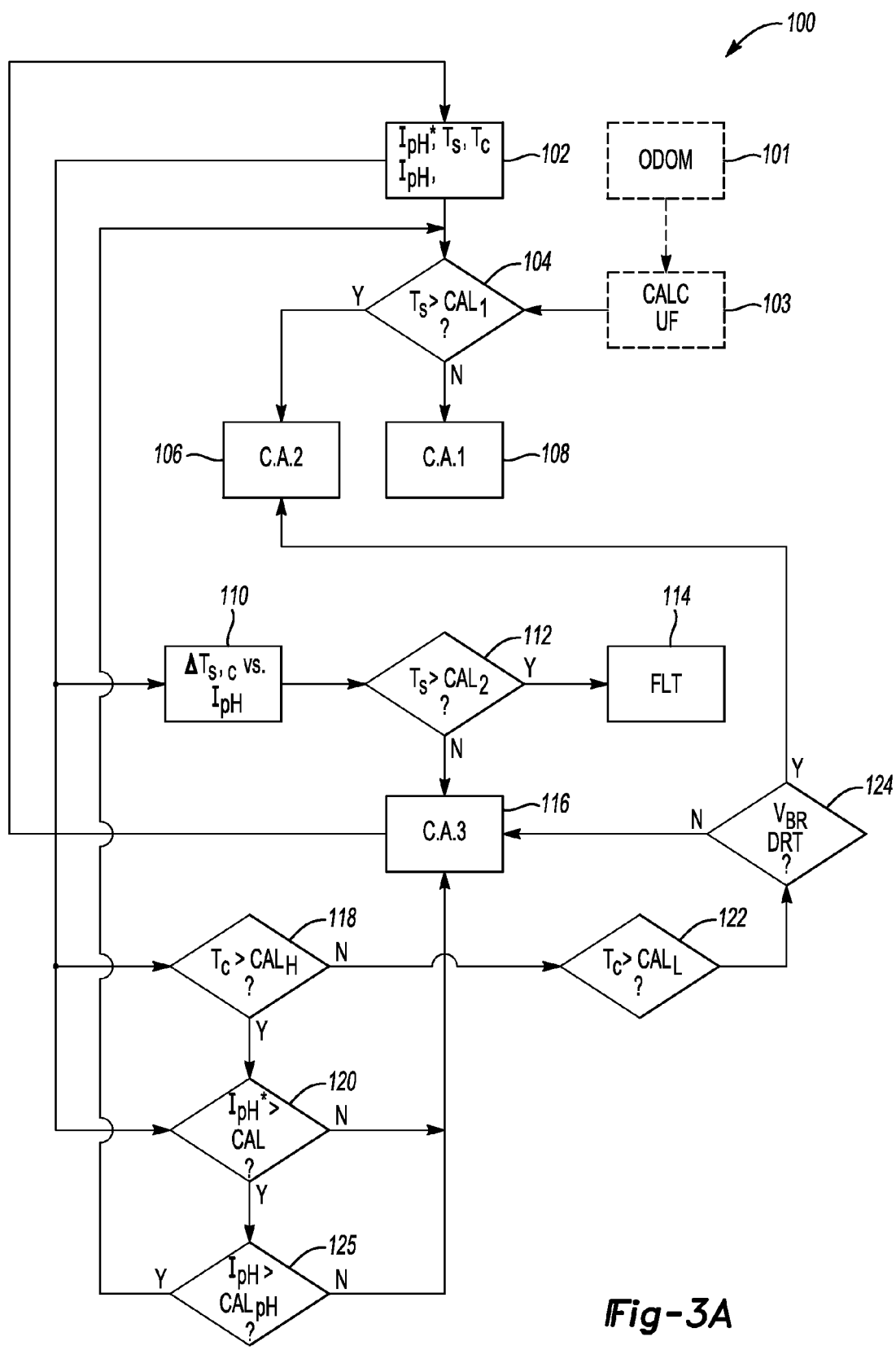
FIG. 3A is a flow chart describing a method for derating operation of the PIM of FIG. 1 in a first embodiment.

Referring to FIG. 3A, a first example embodiment is depicted for the method 100 in which a junction temperature ($\theta_j$) of the semiconductor switches 21 shown in FIG. 1 is indirectly estimated or predicted. Phase current values are considered in method 100 both in terms of the instantaneous phase current ($I_{PH}$) and an accumulated phase current ($I_{PH}^*$), i.e., a recent history of phase currents. With respect to the phase current history, the controller 50 may record a calibrated number of phase currents ($I_{PH}$) in its memory (M) over a given drive cycle of the vehicle 10 of FIG. 1, such as in a circular buffer or array, with the earliest recorded value overwritten by the most recently collected value. A discrete phase current measurement may be recorded with each gate pulse of the switches 21. As is known in the art, the phase current sensors ($S_I$) of FIG. 1 may be used to measure two of the three phrase currents ($I_{PH}$) for a typical AC or polyphase electric machine, with the third phase current calculated using the known two phase currents, or the phase currents may be calculated from the d-axis and q-axis currents as noted above.

At optional step 101, the cumulative distance traveled by the vehicle 10 is read into memory M of the controller 50. For instance, the controller 50 may read the present value of an odometer (ODOM) into memory M. Optional step 101 then proceeds to optional step 103.

At step 102, the controller 50 of FIG. 1 determines the values for phase current ($I_{PH}$), a cumulative phase current ($I_{PH}^*$) over a designated number of samples within a given drive cycle or series of recent drive cycles, measured/thermistor temperature ($T_S$), and the coolant temperature ($T_C$) of coolant circulated within the inverter coolant loop 19I, and then temporarily records these values in memory (M). This information is then used at steps 104, 118, and 120, with the method 100 proceeding to step 104.

At optional step 103, the controller 50 may calculate a numeric usage factor (UF). When the semiconductor switches 21 are new they have lower thermal impedance. As the semiconductor switches 21 age, any degradation of the semiconductor switches 21 over time leads to higher thermal impedance and hence higher temperatures. Step 103 may include using the odometer reading as a proxy for the age of the semiconductor switches 21 which can be applied at step 104. Such a usage factor may be represented mathematically in a possible embodiment as:

$$UF = 1 + \frac{ODOMETER}{TARGETLIFE} \cdot DF$$

with DF representing a calibrated numerical degradation factor, e.g., 0.06, and the target life of the semiconductor switches 21 of FIG. 1 being calibrated values. The method 100 proceeds to step 104 after the usage factor is calculated.

At step 104, the controller 50 determines whether the measured temperature ($T_S$) from within the PIM 22 of FIG. 1 exceeds a first calibration value ($CAL_1$), i.e., a predetermined maximum temperature value such as 150° C. When optional step 103 is used, step 104 may include applying the calculated usage factor (UF) from step 103 to the first calibration value ($CAL_1$), e.g., $$\frac{CAL_1}{UF},$$

to adjust the calibrated maximum temperature for age.

As another example approach to time-adjusted aging of the semiconductor switches 21 of FIG. 1, the first calibration value ($CAL_1$) may be gradually reduced over time in a particular manner, e.g., linearly or according to a calibrated profile. Using the above maximum temperature value of 150° C., for instance, the controller 50 of FIG. 1 may continuously or periodically reduce the maximum temperature value based on the odometer reading. The usage factor will vary with the design and temperature performance of the particular thermistor or other temperature sensor used to measure the temperature ($T_S$) within the PIM 22 of FIG. 1. An optional action enabled by this optional feature is the generation of a diagnostic code to replace the switches 21 when the usage factor falls below a threshold value. The method 100 proceeds from step 104 to step 106 when the measured temperature ($T_S$) exceeds the first calibration value ($CAL_1$). The method 100 proceeds in the alternative to step 108 when the measured temperature ($T_S$) does not exceed the first calibration value ($CAL_1$).

Step 106 is arrived at from step 104 upon a decision by the controller 50 that the first calibration value ($CAL_1$) is presently exceeded by the measured temperature ($T_S$). In such an instance, the controller 50 may execute a control action (C.A. 2), which in this instance includes commencing torque derating of the electric machine 20 of FIG. 1 via the PIM 22 shown in the same Figure. As part of step 106, the controller 50 may set the maximum allowed phase current to the electric machine 20 at a lower relative level to effectively limit the available torque output of the electric machine 20.

Figure 4:
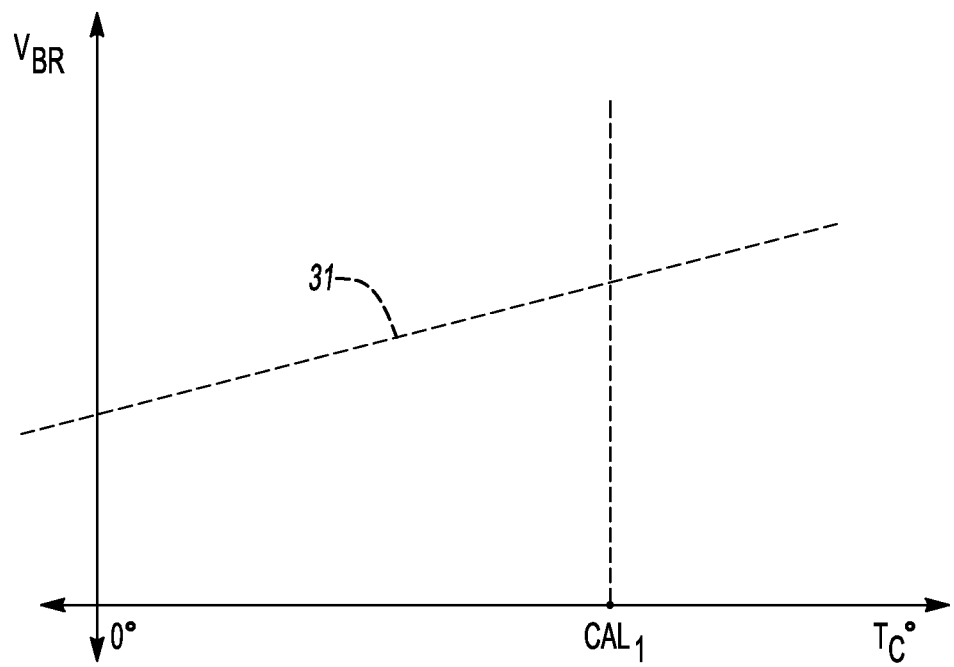
FIG. 4 is a plot describing operation of the present derating strategy, with blocking voltage depicted on the vertical axis and coolant temperature depicted on the horizontal axis.

Referring to FIG. 4, a plot is shown of blocking voltage ($V_{BR}$) of the switches 21 on the vertical axis and coolant temperature ($T_C$) on the horizontal axis. Line 31 represents a derating limit on the semiconductor switches 21. If the voltage applied to the phase windings of the electric machine 20 of FIG. 1 is presently higher than line 31 for a given coolant temperature when the coolant temperature ($T_C$) is lower than the setpoint, i.e., $CAL_1$, the controller 50 limits the applied voltage to the semiconductor switches 21 to the level of line 31, thereby derating the PIM 22 and any torque output of the electric machine 20. This enables a cold derating optional feature in which if temperature is lower than $CAL_1$, the applied voltage is limited to a lower relative value, which is intended to help protect the semiconductor switches 21 from avalanche breakdown in cold temperatures. The method 100 then returns to step 102.

Referring again to FIG. 3A, step 108 is arrived at from step 104 upon a decision by the controller 50 that the first calibration value ($CAL_1$) has not been exceeded. In such an instance, the controller 50 may optionally execute a control action (C.A. 1), e.g., initiating frequency derating, or changing the PWM switching method, e.g., differential PWM (DPWM) or space vector PWM (SVPWM), of the semiconductor switches 21 depending on power needs from the electric machine 20, for instance in response to torque request of a driver of the vehicle 10 of FIG. 1. Frequency derating as used herein refers to a reduction in the switching frequency of the semiconductor switches 21 as commanded via the controller 50, as needed, as opposed to limiting the electrical current through or voltage to the same semiconductor switches 21 as in step 106. The method 100 then returns to step 102.

Figure 6:
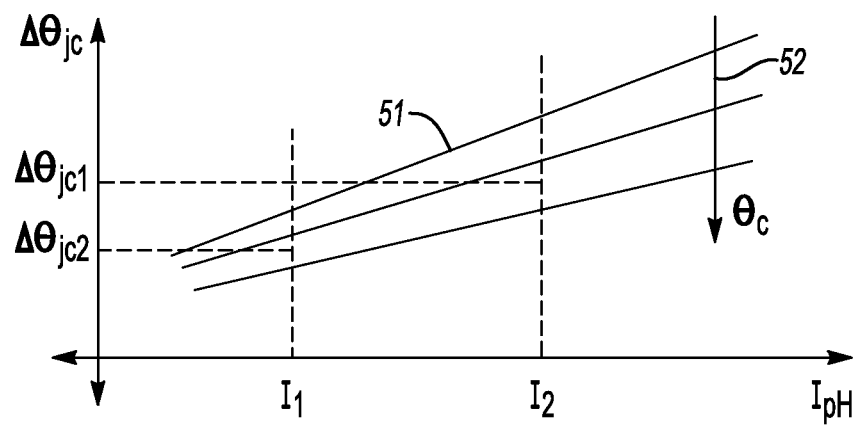
FIG. 6 is a plot describing operation of the present derating strategy, with changing junction temperature depicted on the vertical axis and phase current depicted on the horizontal axis.

Step 110 of method 100 may include calculating a change in coolant temperature ($\Delta T_C$) versus changing phase current ($I_{PH}$) curve. Referring briefly to FIG. 6, coolant temperature is used herein as a stand-in for junction temperature, and is thus represented as $\Delta \theta_{jc}$. Execution of step 110 allows the controller 50 of FIG. 1 to determine if there has likely been a reduction in a flow of coolant in the inverter coolant loop 19I of FIG. 1, e.g., due to a coolant leak or other fault. One way to detect such a condition is to monitor the trend in the change in coolant temperature with increasing phase current ($I_{PH}$). A trace 51 or underlying data describing such a temperature vs. phase current relationship may be referenced to determine if trace 51 is decreasing, as indicated by the direction of arrow 52 in FIG. 6. The method 100 proceeds to step 112 when the change in coolant temperature ($\Delta T_C$) versus changing phase current ($I_{PH}$) curve is captured in memory M of the controller 50.

Step 112 in FIG. 3A includes determining if the measured temperature $T_S$ transmitted to the controller 50 from the sensor $S_T$ of FIG. 1 falls above an appropriate or calibrated one of the traces 51 of FIG. 6. Step 112 may be performed by comparing the measured temperature $T_S$ to a given one of the traces 51, which may be predetermined or calibrated offline. Method 100 proceeds to step 114 if the measured temperature $T_S$ from sensor $S_T$ in the PIM 22 falls above the appropriate trace 51. Step 116 is executed in the alternative when the measured temperature $T_S$ falls below the appropriate trace 51.

Step 114 of method 100 is arrived at upon a determination at step 112 that the measured temperature $T_S$ from sensor $S_T$ falls above an appropriate trace 51 of FIG. 6. As a result of this determination, the controller 50 records an appropriate fault code (FLT), such as a diagnostic code indicating that a possible coolant fault has been detected. The method 100 is then complete.

Still referring to FIG. 3A, step 116 entails executing a control action (C.A. 3), which in this instance includes continuing to drive the vehicle 10 of FIG. 1 without derating power to/torque from the electric machine 20. In other words, arrival at step 116 in the execution of the method 100 results in the unrestricted operation of the electric machine 20 with respect to its allowable torque, with the electric machine 20 operating as needed within the allowable speed/torque operating range of its design. The method 100 then resumes with step 102.

At step 118, the method 100 next includes comparing the measured coolant temperature ($T_C$) from step 102 to a calibrated high threshold ($CAL_H$). The method 100 proceeds to step 120 if the coolant temperature ($T_C$) exceeds the calibrated high threshold ($CAL_H$). The method 100 proceeds to step 122 if the coolant temperature ($T_C$) does not exceed the calibrated high threshold ($CAL_H$).

At step 120, the method 100 includes comparing the cumulative phase current ($I_{PH}^*$) from step 102 to a calibrated cumulative phase current threshold (CAL). The method 100 proceeds to step 125 if the cumulative phase current ($I_{PH}^*$) over, for instance, a designated number of samples within the present drive cycle or within a calibrated window of elapsed time, exceeds the calibrated cumulative phase current threshold. Otherwise the method 100 proceeds to step 116.

At step 124, the controller 50 determines how to derate the PIM 22 based on the blocking voltage ($V_{BR}$) of its semiconductor switches 21. Step 122 determined that the coolant temperature ($T_C$) was too low relative to the calibrated low threshold ($CAL_L$). Thus, coolant temperature ($T_C$) may be sufficiently low to warrant cold derating, i.e., the temperature of the coolant ($T_C$) is too low relative to allow the blocking voltage to be applied to the semiconductor switches 21. Thus, step 124 allows the controller 50 of FIG. 1 to consider the condition of low temperature in its derating decision. If derating is not required, such as when the applied voltage is less than the blocking voltage, the method 100 proceeds to step 116. Otherwise the method 100 proceeds to step 106 where derating commences.

Step 125 of FIG. 3A includes comparing the instantaneous phase current ($I_{PH}$) to a calibrated phase current threshold ($CAL_{PH}$). The method 100 proceeds to step 104 when the instantaneous phase current ($I_{PH}$) exceeds the calibrated phase current threshold ($CAL_{PH}$). The method 100 proceeds instead to step 116 when the instantaneous phase current ($I_{PH}$) does not exceed the calibrated phase current threshold ($CAL_{PH}$).

Figure 3B:
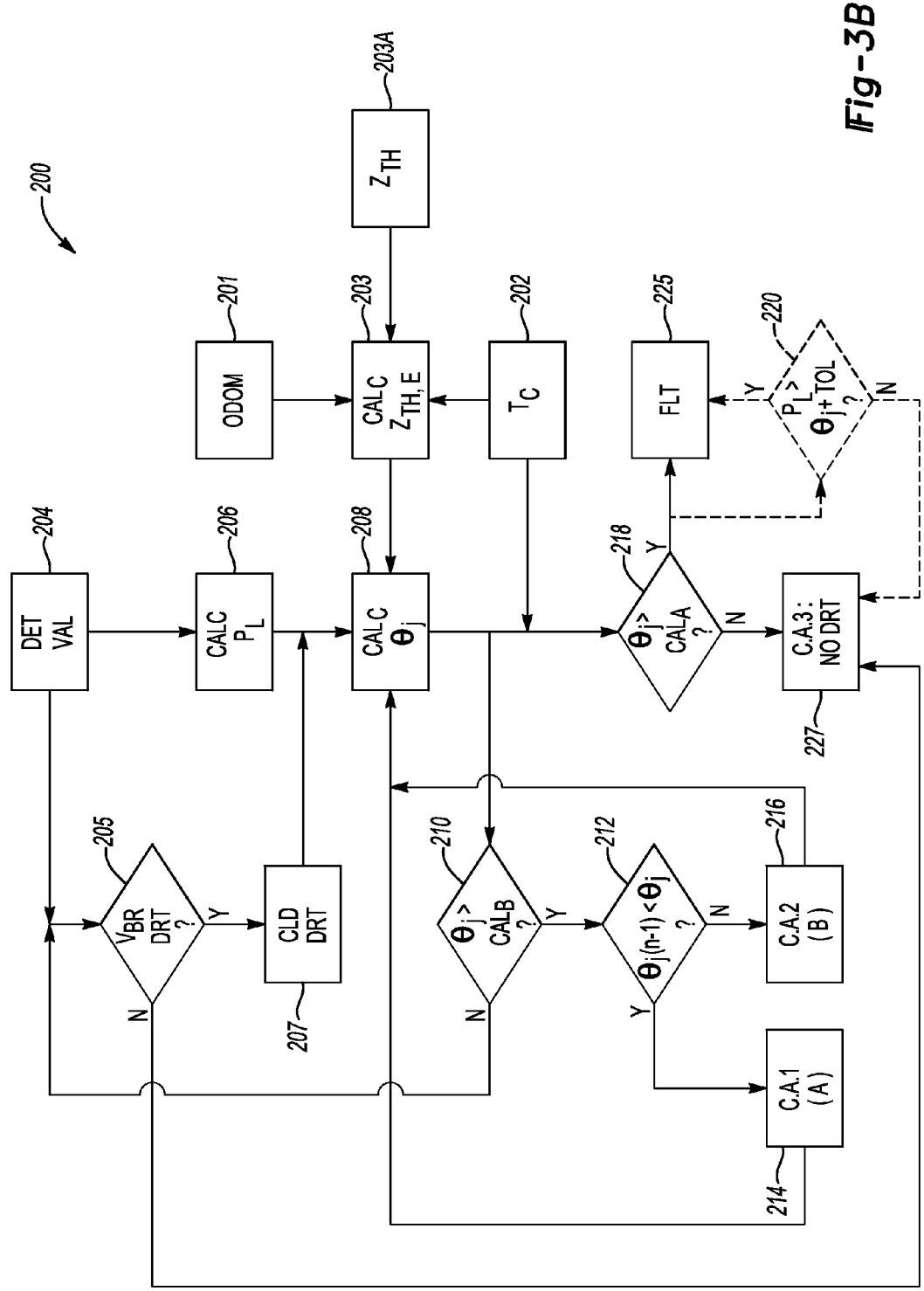
FIG. 3B is a flow chart describing a method for derating operation of the PIM of FIG. 1 in a second embodiment.

Referring to FIG. 3B, an alternative approach to the embodiment of method 100 shown in FIG. 3A and explained above is method 200. In method 200, the temperature sensor $S_T$ of FIG. 1 may be omitted. As with method 100, method 200 is intended to improve upon inaccurate estimation of junction temperature in the semiconductor switches 21 of the PIM 22 and avoids overprotective derating methods which limit motor torque and hence PIM 22 performance long before the junction becomes too hot. Method 200, like method 100, considers the coolant temperature ($T_C$) variation and predicts junction temperature ($\theta_j$) at runtime without limiting performance until the PIM 22 nears a calibrated maximum temperature.

It is recognized herein that the junction temperature ($\theta_j$) depends on the coolant temperature ($T_C$), the thermal impedance ($Z_{TH}$) of the stack forming the semiconductor switch 21, and certain motor operating conditions, particularly power loss ($P_L$):

$$\theta_j = f(T_C, P_L, Z_{TH})$$

As is known in the art, power loss ($P_L$) may be determined as a function of various operating parameters of the electric machine 20:

$$P_L = f(V_{DC}, \omega_r, V_d, V_q, I_d, I_q, L_{var}, C_{met})$$

where $V_{DC}$ is the DC bus voltage, $\omega_r$ is the speed of the rotor of the electric machine 20, $V_d$, $V_q$, $I_d$, and $I_q$ are the controller-determined d-q axes voltages and currents, respectively, $L_{var}$ represents any known loss polynomials, and $C_{met}$ represents the particular control frequency and method used. Such variables are readily available in typical motor control logic, and their closed-form relationship is thus well known in the art.

Available torque ($T_A$) as commanded by the controller 50 is varied according to the method 200. Available torque, itself a function of many factors, can be generally represented by the following equation:

$$T_A = f(\theta_j, L_C, L_{cf}, V_{BR}, \omega_{st})$$

where $L_c$ is the volumetric loss of coolant, $L_{cf}$ is the loss of coolant flow in the inverter coolant loop 19I of FIG. 1, $V_{BR}$ is the blocking voltage of the semiconductor switches 21, and $\omega_{st}$ is the calibrated stall speed of the electric machine 20. In method 200, available torque of the electric machine 20 will vary according to a run-time estimate of junction temperature $\theta_j$. As with method 100, torque derating is not applied until a maximum allowable junction temperature is approached, i.e., in accordance with trace 32 of FIG. 2.

Optional step 201 of method 100 includes determining the cumulative distance traveled by the vehicle 10 to date, which is read into memory M of the controller 50 as with step 101 noted above. Optional step 201 then proceeds to step 203.

Step 202 includes measuring the coolant temperature $T_C$, e.g., via a sensor $S_T$ of FIG. 1, and the proceeding to steps 203 and 218.

Step 203A includes determining the thermal impedance $Z_{TH}$. Such a value may be determined offline for a given switch 21 and recorded in memory M as a calibrated value.

Step 203 includes optionally adjusting the thermal impedance $Z_{TH}$ of step 203A for age in a manner similar to that conducted in step 103 of FIG. 3A. For instance, the thermal impedance $Z_{TH}$ can be adjusted via application of a usage factor (UF), e.g., by multiplying the thermal impedance by the usage factor to determine an effective thermal impedance $Z_{TH, E}$, and/or modified based on coolant temperature ($T_C$) as explained in step 103. The method 200 then proceeds to step 208.

At step 204, the controller 50 determines a set of values (DET VAL) for its system, including d-q axes voltages and currents $V_d$, $V_q$, $I_d$, and $I_q$, the DC bus voltage $V_{DC}$, and the present motor speed $\omega_r$. The method 200 then proceeds to steps 205 and 206.

At step 205, the controller 50 determines if torque derating is required based on the comparison of applied voltage and the blocking voltage ($V_{BR}$ DRT) of FIG. 4. This step is analogous to step 124 of method 100 as described above. If torque derating is not required, the method 100 proceeds to step 227. Otherwise the method 200 proceeds to step 207.

Figure 7:
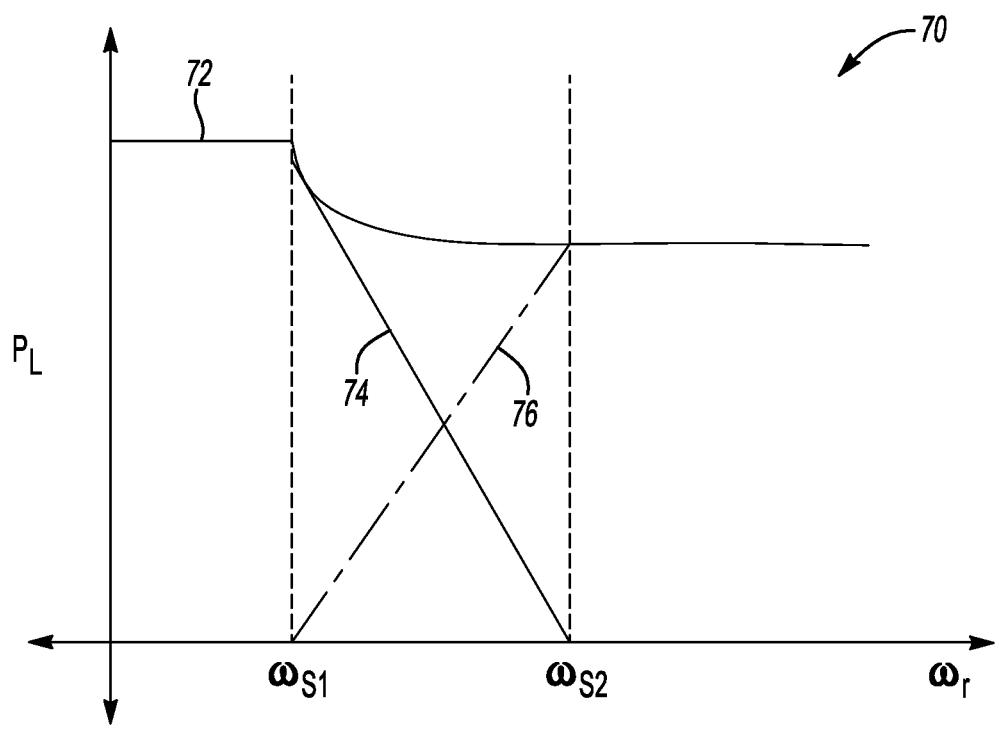
FIG. 7 is a plot describing power loss on the vertical axis and motor speed on the horizontal axis.

Step 206 entails calculating the power loss ($P_L$), as is known in the art, and then proceeding to step 208. Step 206 may optionally include performing a motor stall check. Referring briefly to FIG. 7, traces 70 illustrate power loss ($P_L$) on the vertical axis and motor speed on the horizontal axis, with power loss depicted as trace 72. As is known in the art, power loss at stall speeds ($P_{LS}$) and at non-stall speeds ($P_{LNS}$) for a given motor, e.g., the electric machine 20, is a function of various parameters such as DC bus voltage, switching frequency, modulation index, and power factor. This may be determined offline and recorded in memory as calibrated values. Step 206 may include calculating the power loss ($P_L$) per switch 21 as a function of these known values:

$$P_L = P_{LS} \cdot A + P_{LNS} \cdot (1-A)$$

where A=1 when motor speed ($\omega_r$) is less than a first setpoint ($\omega_{s1}$), e.g., 50 RPM. When motor speed ($\omega_r$) is less than a higher second setpoint, e.g., 100 RPM, the value of A may be calculated as follows:

$$A = \frac{\omega_{s2} - \omega_r}{\omega_{s2} - \omega_{s1}}$$

At all other times A=0 in the above power loss formula.

At step 207 the controller 50 executes a cold derate as described above with reference to step 106 of FIG. 3A with reference to FIG. 4, and then proceeds to step 208.

Step 208 includes calculating the estimated junction temperature $\theta_j$, which as noted above is a function of coolant temperature $T_C$, power loss $P_L$, and thermal impedance $Z_{TH}$. The method 200 then proceeds to steps 210 and 218.

Step 210 includes comparing the junction temperature $\theta_j$ from step 208 to a calibrated threshold ($CAL_B$), e.g., 150° C. The method 200 proceeds to step 205 if the calculated junction temperature $\theta_j$ is less than the calibrated threshold ($CAL_B$), and to step 212 in the alternative.

Step 212 includes determining if a previously calculated junction temperature ($\theta_{j(n-1)}$) is less than the current junction temperature $\theta_j$. If so, the controller determines that the semiconductor switches 21 are increasing in temperature, and as a result the method 200 proceeds to step 214. The method 200 proceeds instead to step 216 if the previously calculated junction temperature ($\theta_{j(n-1)}$) exceeds the current junction temperature $\theta_j$, i.e., the switches 21 are cooling.

Figure 5:
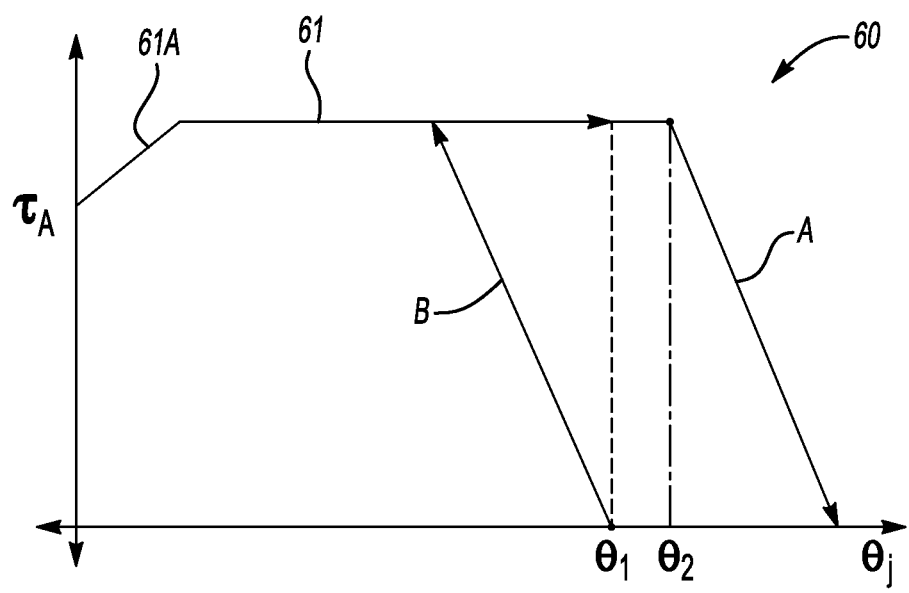
FIG. 5 is a plot describing operation of the present derating strategy, with available torque depicted on the vertical axis and junction temperature depicted on the horizontal axis.

Referring briefly to FIG. 5, which depicts available torque ($\tau_A$) on the vertical axis and junction temperature ($\theta_j$) on the horizontal axis, in a possible embodiment the controller 50 may apply a hysteresis band 60 to coordinate the initiation and discontinuation of torque derating at the following steps 214 and 216. The manner in which the hysteresis band is applied depends on whether the switches 21 of FIG. 1 are increasing or decreasing in temperature. For instance, as the calculated/estimated junction temperature ($\theta_j$) increases, the available torque $\tau_A$, i.e., the maximum allowed torque output of the motor electric machine 20, after initially rising (trace 61A) may be maintained at a constant level as indicated by the flat trajectory of trace 61 until torque derating commences at about temperature ($\theta_2$), whereupon the controller 50 derates the available torque $\tau_A$ according to the trajectory of path A. However, derating is not immediately discontinued when the junction temperature again drops below temperature ($\theta_2$). Rather, the controller 50 waits until a lower threshold temperature ($\theta_1$) is reached before gradually discontinuing the derating according to the trajectory of path B. Such a control approach may help to minimize electrical losses and system noise.

At step 214, the method 200 includes derating the torque output of the motor 20 of FIG. 1 via path A of FIG. 5 as described above. The method 200 then returns to step 208.

At step 216, the method 200 includes derating the torque output of the motor 20 of FIG. 1 via path B of FIG. 5 as described above. The method 200 then returns to step 208.

Step 218 entails comparing the calculated junction temperature $\theta_j$ to a calibrated curve, a step that is analogous to step 110 as described above. Step 227 is executed if the calculated junction temperature $\theta_J$ falls below the curve, and step 225 is executed if the calculated junction temperature $\theta_J$ falls above the curve.

Optional step 220 may be used when a temperature sensor $S_T$ is used to measure the temperature of the semiconductor switches 21. Such a sensor $S_T$ is not needed for oration of method 200. However, if the sensor $S_T$ is used it may provide an alternative approach to a decision as to whether to execute step 225. At step 220, the controller 50 may compare the measured temperature $T_S$ to the calculated or estimated junction temperature $\theta_J$ from step 208 plus a tolerance (TOL). Step 225 may be executed when the measured temperature $T_S$ exceeds this value. Otherwise, step 227 may be executed, i.e., derating is not applied.

Step 225 is analogous to step 114 of FIG. 3A, and is arrived at upon a determination at step 218 that the junction temperature is above an appropriate trace 51. As a result of this determination, the controller 50 records an appropriate fault code (FLT), such as a diagnostic code indicating that a possible coolant fault has been detected. The method 100 is then complete.

At step 227 the controller 50 executes a control action (C.A. 3), which in this instance includes continuing to drive the vehicle 10 of FIG. 1 without derating torque from the electric machine 20. In other words, as with step 116 of method 100, arrival at step 227 results in the unrestricted operation of the motor 20 of FIG. 1 with respect to its allowable torque.

As will be understood by one of ordinary skill in the art working with the above methodologies, the controller 50 is programmed to perform each of the following tasks: change a PWM switching method of the PIM 22, reduce a frequency of switching of the semiconductor switches 21, and reduce a torque or current command to the electric machine 20. The controller 50 is further programmed to selectively derate the PIM 22 by selecting one of changing the PWM switching method of the PIM 22, reducing the frequency of switching of the semiconductor switches 21, and reducing the torque or current command to the electric machine 20. The controller 50 may perform more than one of these actions, and may do so in a particular order, e.g., First changing the PWM method, then reducing the switching frequency, and then reducing the torque or current command, with the particular order depending how quickly and/or how much derating is required.

While the best modes for carrying out the disclosure have been described in detail, those familiar with the art to which this disclosure relates will recognize various alternate designs and embodiments within the scope of the appended claims.

The invention claimed is:

1. A system comprising: a direct current (DC) battery pack;
   a polyphase electric machine;
   a power inverter module (PIM) that is electrically connected to the DC battery pack and to the polyphase electric machine, wherein the PIM includes a plurality of semiconductor switches;
   an inverter coolant loop operable to cool the PIM via a circulation of coolant;
   a first temperature sensor configured to measure a temperature of the coolant in the inverter coolant loop;
   a second temperature sensor configured to measure a temperature of the PIM; and
   a controller in communication with the PIM that is operable to selectively derate the PIM and thereby reduce a commanded torque to the electric machine, wherein the controller is programmed to:
   receive the temperature of the coolant from the first temperature sensor and the temperature of the PIM from the second temperature sensor;
   determine a set of electrical values of the electric machine;
   estimate a junction temperature of the semiconductor switches using the temperature of the coolant, the temperature of the PIM, and the set of electrical values;
   selectively derate the PIM using the estimated junction temperature when the temperature of the PIM exceeds a calibrated maximum temperature by limiting a torque command to and available torque from the polyphase electric machine, including:
   calculating a numeric usage factor indicative of an age of the semiconductor switches; and
   reducing the calibrated maximum temperature using the calculated numeric usage factor.

2. The system of claim 1, further comprising a transmission, wherein the system is a vehicle and the electric machine delivers a motor torque to the transmission.

3. The system of claim 1, wherein the controller is programmed to derate the PIM by reducing an electrical phase current delivered to the electric machine.

4. The system of claim 1, wherein the set of electrical values includes electrical phase currents of the electrical machine.

5. The system of claim 4, wherein the controller is programmed to record a corresponding value of a calibrated number of the electrical phase currents in memory of the controller to thereby generate a cumulative phase current, and to selectively derate the PIM when the cumulative phase current and the instantaneous phase current exceed corresponding thresholds.

6. The system of claim 1, wherein the set of electrical values includes a power loss and a thermal impedance of the semiconductor switches.

7. The system of claim 1, wherein the controller is programmed to determine an odometer reading of the vehicle, and to calculate the numeric usage factor using the odometer reading.

8. The system of claim 1, wherein the controller is programmed with a calibrated coolant temperature setpoint and a voltage vs. coolant temperature curve, and is operable to limit an applied voltage to the switches when the measured coolant temperature exceeds the calibrated coolant temperature setpoint and a present voltage applied to the electric machine is high relative to the curve.

9. The system of claim 1, wherein the controller is programmed to determine a trend in a change in the coolant temperature with respect to the phase current, and to detect a potential loss of the coolant using the trend.

10. A method for derating a power inverter module (PIM) in a system having the PIM, a DC battery pack, an inverter coolant loop operable for cooling the PIM via a circulation of a coolant, and a polyphase electric machine, the method comprising:
   receiving, via a controller, a temperature of the coolant in the inverter coolant loop from a first temperature sensor;
   receiving, via the controller, a temperature of the PIM from a second temperature sensor;
   determining a set of electrical values of the electric machine, including an electrical current value of the electric machine;

estimating a junction temperature of a plurality of semiconductor switches of the PIM using the temperature of the coolant, the temperature of the PIM, and the set of electrical values; and selectively derating the PIM, via the controller, using the estimated junction temperature when the temperature of the PIM exceeds a calibrated maximum temperature to thereby reduce a commanded torque to the electric machine, including limiting a torque command to and available torque from the polyphase electric machine, including:

calculating, via the controller, a numeric usage factor indicative of an age of the semiconductor switches; and reducing the calibrated maximum temperature using the calculated numeric usage factor.

11. The method of claim 10, wherein the system is a vehicle having a transmission, and wherein selectively derating the PIM includes causing the electric machine to deliver a reduced level of motor torque to the transmission.

12. The method of claim 10, wherein derating the PIM includes reducing the electrical phase currents delivered to the electric machine.

13. The method of claim 12, further comprising recording a corresponding value of a calibrated number of the electrical phase currents in memory of the controller to thereby generate a cumulative phase current; and selectively derating the PIM via the controller when the cumulative phase current and the instantaneous phase current exceed corresponding thresholds.

14. The method of claim 10, wherein the set of electrical values includes electrical phase currents of the electrical machine.

15. The method of claim 10, wherein the set of electrical values includes a power loss and a thermal impedance of the semiconductor switches.

16. The method of claim 10, further comprising limiting an applied voltage to the semiconductor switches of the PIM when the measured coolant temperature falls below a calibrated coolant temperature setpoint and a present phase voltage applied to the electric machine is high relative to a calibrated value.

17. The method of claim 10, wherein the controller is programmed to monitor a trend in a change in the temperature of the coolant with respect to a phase current of the electric machine, and to detect a potential loss of the coolant using the trend.

18. The method of claim 10, wherein the controller is programmed to change a pulse width modulation switching method of the PIM, reduce a frequency of switching of the semiconductor switches, and reduce a torque or current command to the electric machine, and is further programmed to selectively derate the PIM by selecting one of changing the pulse width modulation switching method of the PIM, reducing the frequency of switching of the semiconductor switches, and reducing the torque or current command to the electric machine.

* * * * *